3,370,036
STABILIZATION OF POLYMERS WITH UV
STABILIZERS AND ANTIOXIDANTS
Robert J. Martinovich, Bartlesville, Okla., assignor to Phillips Petroleum Company, a corporation of Delaware
No Drawing. Filed July 2, 1962, Ser. No. 207,017
2 Claims. (Cl. 260—45.85)

This invention relates to the stabilization of polymer. It relates to the stabilization against ultraviolet radiation or oxidative or heat degradation of a polymer, for example a 1-olefin polymer or a copolymer of a 1-olefin with a higher molecular weight 1-olefin, e.g., a copolymer of ethylene and 1-butene.

According to the invention, the tensile strength of a polymer such as a solid polymer of a 1-olefin, e.g., polyethylene, polypropylene, etc., or a copolymer of say ethylene and a higher 1-olefin, as prepared by methods known in the art, for example, as disclosed and claimed in Patent 2,825,721, issued March 4, 1958, John Paul Hogan and Robert L. Banks, is markedly preserved by incorporating therewith a small amount of each of a stabilizer against ultraviolet light and an antioxidant. Also, according to the invention, compositions of these additives are provided.

It is an object of this invention to stabilize a polymer to preserve its desirable properties such as tensile strength, etc. It is another object of this invention to stabilize a polymer of a 1-olefin. It is a further object of this invention to stabilize a copolymer of a 1-olefin and a higher molecular weight 1-olefin. It is a further object of this invention to stabilize against ultraviolet degradation a solid polymer or copolymer of a 1-olefin. It is a further object of this invention to provide a method for the stabilization of a polymer or copolymer such as a polyolefin or copolymerized olefins obtained by polymerizing or copolymerizing 1-olefins as herein described. It is a still further object of this invention to provide a composition of additives suitable for addition to a polymer or a copolymer for stabilizing the same against ultraviolet degradation, oxidative or heat deterioration and to preserve the desirable properties of the polymer or copolymer.

Other objects and the several advantages of the invention are apparent from a study of this disclosure and the appended claims.

The polyolefins or polymers or copolymers to which the invention is applicable include those which can be prepared from aliphatic 1-olefins having from 2 to 8 carbon atoms per molecule and no branching nearer the double bond than the 4-position at a polymerization temperature of up to about 500° F. with a catalyst active for such polymerization and comprising chromium oxide upon a suitable carrier, at least a part of the chromium being in the hexavalent state when the hydrocarbon contacts the catalyst at the initial contacting of the catalyst with the hydrocarbon.

Other polymers and copolymers, including solid polymers and copolymers, of 1-olefins prepared by other known methods can also be stabilized according to the present invention, which will now be described as applied to a solid polymer of ethylene and a solid copolymer of ethylene and 1-butene.

It will be understood by one skilled in the art in possession of this disclosure and the general knowledge of the art relating to the ultraviolet or oxidative degradation of polyolefins such as polyethylene, polypropylene, etc., and copolymers as herein discussed, that the results which are herein exemplified by data obtained with the herein identified polyolefin (polyethylene) and copolymer (ethylene and 1-butene copolymer) can also be obtained with other related polymers or copolymers.

Polymer (A) in Examples 1 through 4 was polyethylene. Polymer (B) in Example 5 was a copolymer of ethylene and butene-1. This polymer contained about 2.5 percent butene-1. The polymer and copolymer are characterized by the following properties:

| Property | Polymer (A) | Polymer (B) | Test Method |
|---|---|---|---|
| Density, gms./cc. | 0.960 | 0.950 | ASTM D1505, 57T. |
| Melt Index | 0.2 | 1.2 | ASTM D1238, 57T. |
| Tensile Strength, p.s.i. | 4,400 | 3,800 | ASTM D638–58T. |
| Elongation, percent | 30 | 40 | ASTM D638, 58T. |
| Environmental Stress Cracking Resistance, hours. | 60 | 55 | ASTM D1693–59T. |

EXAMPLE I

Using polymer (A) (polyethylene) the following additives were incorporated as herein described:

Santonox (Monsanto Chemical Company), Antioxidant, 4,4'-thiobis-(3-methyl-6-t-butyl phenol).
TBS (Dow Chemical Company), UV Stabilizer, para-tertiary butyl phenyl salicylate.

| Sample Run | Additive, percent | Weather-Ometer, hours | Tensile Strength, p.s.i. | Elongation, percent |
|---|---|---|---|---|
| 1 | Control | 200 | 2,330 | 4.0 |
| 2 | 0.10 Santonox | 500 | 2,080 | 4.0 |
| 3 | 0.10 TBS | 800 | 1,870 | 2.5 |
| 4 | 0.25 TBS | 1,250 | 1,560 | 3.0 |
| 5 | 0.50 TBS | 2,000 | 1,993 | 4.0 |
| 6 | 0.10 Santonox–0.50 TBS. | 3,500 | 3,670 | 14.0 |

The control prior to exposure in the Weather-Ometer had a tensile strength of 4400. After 200 hours exposure the tensile strength, as shown in the table, had been reduced to 2330. Elongation was 4 percent for this sample.

Whereas after 500 hours with .1 percent 4,4'-thiobis-(3-methyl-6-t-butyl phenol) and .5 percent of para tertiary-butyl phenyl salicylate, after 2000 hours exposure, the tensile strengths were, for additional polyethylene compounded, as stated, 2080 and 1993, respectively, a sample of the polyethylene, here identified, including a combination of the additives in the recited percentages, namely .1 percent of the former and .5 percent of the latter, having been exposed for 3500 hours, gave a tensile strength of 3670. The elongations for the three samples here discussed, namely samples 2, 5 and 6, respectively, were 4, 4 and 14, respectively.

Thus when both additives were added according to the invention, in combination, a 3½ fold increase in elongation was obtained and the tensile strength was about 55 percent greater than that of the control run, Run 1, and this after testing for 17 times as long as the testing in the control run, i.e., testing for 3500 hours in Run 6 as against only 200 hours in Run 1.

It is evident from the foregoing table and its discussion that the use of the combination of the two additives to stabilize a polyolefin such as polyethylene yields unexpectedly very greatly improved results. These results could not have been forseen. When it is borne in mind that the additives employed are each of them considered to be very good products for increasing resistance to ultraviolet light and other degradation upon exposure, it will be recognized that the improvement here demonstrated is quite out of the ordinary.

In the following are given additional examples of the invention. Similar discussion to that of Example I can be made in regard to said examples.

EXAMPLE II

UV 531 (American Cyanamid Co.), UV Stabilizer, 2-hydroxy-4-n-octoxybenzophenone.
DLTDP (American Cyanamid Co.), Antioxidant, Dilaurylthiodipropionate.

POLYMER (A)

| Sample Run | Additive, percent | Weather-Ometer, hours | Tensile Strength, p.s.i. | Elongation, percent |
|---|---|---|---|---|
| 1 | Control | 200 | 2,330 | 4.0 |
| 2 | 0.25 UV 531 | 1,500 | 3,200 | <5.0 |
| 3 | 0.05 DLTDP | 500 | <2,000 | <5.0 |
| 4 | 0.05 DLTDP-0.25 UV 551 | 2,500 | 4,400 | 15.0 |

EXAMPLE III (Dow Chemical Co.), UV Stabilizer, bis-phenol-A-disalicylate.
(Dow Chemical Co.), Antioxidant, 4,4-isopropylindene-bis-2-tertiary butyl phenol.

POLYMER (A)

| Sample Run | Additive, percent | Weather-ometer, hours | Tensile Strength, p.s.i. | Elongation, percent |
|---|---|---|---|---|
| 1 | Control | 200 | 2,330 | 4.0 |
| 2 | 0.50 UV Stabilizer | 2,500 | 2,800 | 4.0 |
| 3 | 0.50 Stabilizer, 0.1 Antioxidant | 3,000 | 3,270 | 14.00 |

EXAMPLE IV

Santonox (Monsanto Chemical Co.), Antioxidant, 4,4'-thiobis-(3-methyl-6-t-butyl phenol).
OPS (Eastman Chemical Co.), UV Stabilizer, p-octylphenyl salicylate.

POLYMER (A)

| Sample Run | Additive, percent | Weather-ometer, hours | Tensile Strength, p.s.i. | Elongation, percent |
|---|---|---|---|---|
| 1 | Control | 200 | 2,330 | 4.0 |
| 2 | 0.5 OPS | 3,500 | 1,960 | 3.0 |
| 3 | 0.1 Santonox | 500 | 2,080 | 4.0 |
| 4 | 0.5 OPS-0.1 Santonox | 3,500 | 4,040 | 18.00 |

EXAMPLE V

Santonox (Monsanto Chemical Co.), Antioxidant, 4,4'-thiobis-(3-methyl-6-t-butyl phenol).
UV 531 (American Cyanamid Co.), UV Stabilizer, 2-hydroxy-4-n-octoxybenzophenone.

POLYMER (B)

| Sample Run | Additive, percent | Weather-ometer, hours | Tensile Strength, p.s.i. | Elongation, percent |
|---|---|---|---|---|
| 1 | Control | 200 | <2,000 | <5.0 |
| 2 | 0.10 Santonox | 500 | <2,000 | <5.0 |
| 3 | 0.5 UV 531 | 1,250 | 1,895 | 3.0 |
| 4 | 0.1 Santonox-0.5 UV 531 | 1,250 | 3,690 | 9.0 |

It appears that when both an ultraviolet stabilizer and an antioxidant are incorporated into a polymer or copolymer, here discussed, a more than additive effect occurs and that, indeed, the tensile strength of the compounded materials is very considerably improved.

The polyolefins to which this invention is particularly applicable, with results similar to those herein set forth, are the polymers and copolymers, especially solid polymers and copolymers, of ethylene, propylene, butene-1, pentene-1, hexene-1, heptene-1 and octene-1.

The combination of additives can be blended into the polymers by known methods, for example, by simply melting the polymer or sufficiently softening the same so that the additives can be mechanically blended thereinto, either as such or dissolved in a suitable solvent which then can be recovered from the blend. Also, the additives can be blended into the polymers during a stage of recovery from the process of their preparation. In the obtaining of the above data the additives were incorporated as follows. Samples were mill blended. Dry polymer was placed on a two-roll mill and milled until molten, then additives were added and milling continued for a total time of ten minutes. Temperature of milling was between 300–350° F.

Generally, according to the invention, the amount of the antioxidant, for example, 4,4'-thiobis-(3-methyl-6-t-butyl phenol), incorporated with the ultraviolet stabilizer, for example, tertiary-butyl phenol salicylate, into the polymer or copolymer to be improved with respect to its tensile strength or stability characteristics will be in the range of .05 to .1 percent while the amount of the latter will be .25 to 1, preferably about .5 percent by weight of the polymer to be stabilized. Further, the ratio of the former additive to the latter in the combination of the additives in the polymer will usually lie in the range 2.5 to 1 to 10 to 1.

The compounds which are combined in the present invention to stabilize the polymers or copolymers to permit the compounding of polymers which exhibit a Weather-Ometer life period which is considerably larger than would be expected from the life period obtained by adding the effects of each of the compounds used in the same amounts singly with the polymers or copolymers are generally available and known in the art as ultraviolet stabilizers and antioxidants.

The following compounds, which are now preferred, can be used as in the examples.

TABLE

| Ultraviolet Light Stabilizers | Antioxidants |
|---|---|
| TBS (Dow Chemical Co.), para tertiary-butyl phenyl salicylate. | Santonox (Monsanto Chemical Co), 4,4'-thiobis-(3-methyl-6-t-butyl phenol). |
| UV 531 (American Cyanamid Co.), 2-hydroxy-4-n-octoxybenzophenone. | DLTDP (American Cyanamid Co.), Dilaurylthiodipropionate. |
| (Dow Chemical Co.), bis-phenol-A-disalicylate. | (Dow Chemical Co.), 4,4-isopropylindene-bis-2-tertiary butyl phenol. |
| OPS (Eastman Chemical Co.), p-octylphenyl salicylate. | |
| UV 314 (American Cyanamid Co.), 2,2-dihydroxy-4-n-octoxy benzophenone. | |

The polyethylene and copolymers used in the foregoing tests are generally available under the trademark Marlex, which is the Phillips Petroleum Company's trademark for polyolefins produced by the so-called low pressure process, as now known in the art. The specimen of Marlex contained 1 percent of No. 1409 Cadimium Orange pigment. The tests were carried out by aging in an Atlas Weather-Ometer.

It will be evident to one skilled in the art that according to this invention there is also provided a combination of additives, as disclosed, suitable for incorporation and co-action in similar or related polymeric substances.

Reasonable variation and modification are possible within the scope of the foregoing disclosure and the appended claims to the invention, the essence of which is that a combination of additives as described herein has been incorporated into a poly 1-olefin or copolymer of a 1-olefin with a higher molecular weight 1-olefin, and found to yield superior results with respect to stabilization against deterioration of the tensile strength of said polymer or copolymer, as herein described, and that said combination of additives includes a stabilizer against ultraviolet light deterioration and an antioxidant.

I claim:

1. A solid polymer of an aliphatic 1-mono-olefin, having a maximum of 8 carbon atoms and no branching nearer the double bond than the 4-position stabilized with a stabilizer combination consisting essentially of 4,4'-thiobis-(3-methyl-6-t-butyl phenol) and para-tertiary-butyl phenyl salicylate, the former additive being present in an amount in the range of 0.05 to 0.1 percent by weight, and the latter additive being present in an amount 0.25 to 0.5 percent by weight, of the polymer stabilized therewith.

2. A solid polymer selected from the group consisting of polyethylene and ethylene-butene-1 copolymer stabilized with a combination of stabilizer compounds consisting essentially of about 0.25 to 0.5 weight percent para-tertiary-butyl phenyl salicylate and about 0.05 to 0.1 percent by weight 4,4'-thiobis-(3-methyl-6-t-butyl phenol).

References Cited

UNITED STATES PATENTS

| | | | |
|---|---|---|---|
| 3,000,856 | 9/1961 | Newland et al. | 260—45.95 |
| 3,000,857 | 9/1961 | Craven | 260—45.95 |
| 3,006,959 | 10/1961 | Armitage | 260—45.95 |
| 3,033,814 | 5/1962 | Tholstrup | 260—45.85 |
| 3,149,093 | 9/1964 | Hecker et al. | 260—45.95 |
| 3,183,283 | 5/1965 | Reding | 260—45.95 |

DONALD E. CZAJA, *Primary Examiner.*

LEON J. BERCOVITZ, *Examiner.*

H. E. TAYLOR, Jr., *Assistant Examiner.*